United States Patent
Shimanouchi et al.

(10) Patent No.: US 6,870,709 B2
(45) Date of Patent: Mar. 22, 2005

(54) HEAD SLIDER HAVING PIEZOELECTRIC ACTUATOR

(75) Inventors: Takeaki Shimanouchi, Kawaskai (JP); Ryousuke Koishi, Kobe (JP); Takahiro Imamura, Kawaskai (JP)

(73) Assignee: Fujitsu Limited, Kawasaki (JP)

( * ) Notice: Subject to any disclaimer, the term of this patent is extended or adjusted under 35 U.S.C. 154(b) by 49 days.

(21) Appl. No.: 10/101,009

(22) Filed: Mar. 19, 2002

(65) Prior Publication Data

US 2003/0095361 A1 May 22, 2003

(30) Foreign Application Priority Data

Nov. 16, 2001 (JP) ........................................ 2001-351316

(51) Int. Cl.⁷ .............................................. G11B 5/56
(52) U.S. Cl. ................................................. 360/294.4
(58) Field of Search ........................... 360/294.1–294.6, 360/234.7–234.9

(56) References Cited

U.S. PATENT DOCUMENTS

| | | | | |
|---|---|---|---|---|
| 4,532,802 A | * | 8/1985 | Yeack-Scranton et al. | 73/866.4 |
| 5,021,906 A | * | 6/1991 | Chang et al. | 360/235.1 |
| 6,246,552 B1 | * | 6/2001 | Soeno et al. | 360/294.4 |
| 6,338,269 B1 | * | 1/2002 | Burga et al. | 73/105 |
| 6,435,016 B1 | * | 8/2002 | Smith et al. | 73/105 |
| 6,538,854 B2 | * | 3/2003 | Koganezawa et al. | 360/294.4 |
| 6,557,399 B1 | * | 5/2003 | Ku et al. | 73/105 |
| 6,611,399 B1 | * | 8/2003 | Mei et al. | 360/234.7 |
| 6,624,984 B2 | * | 9/2003 | Lewis et al. | 360/294.7 |
| 6,690,543 B2 | * | 2/2004 | Kurita et al. | 360/234.7 |

FOREIGN PATENT DOCUMENTS

JP     2000-348321 A     12/2000

* cited by examiner

*Primary Examiner*—Angel Castro
(74) *Attorney, Agent, or Firm*—Greer, Burns & Crain, Ltd.

(57) ABSTRACT

A head slider includes a front rail having an air bearing surface and a step surface lower than the air bearing surface, provided on a disk faced surface in the vicinity of an air inflow end, a transducer provided in the vicinity of an air outflow end, and a groove for generating a negative pressure by expanding air once compressed by the front rail. The head slider further includes a piezoelectric actuator mounted on a head slider back surface on the opposite side of the disk faced surface excluding the vicinity of the air outflow end. By the piezoelectric actuator, the front rail and the neighboring portion are deformed in the direction toward the recording medium or away from the recording medium, and the positive pressure generated at the air bearing surface is regulated, whereby the floating amount of the head slider can be regulated.

7 Claims, 18 Drawing Sheets

HEAD SLIDER HAVING PIEZOELECTRIC ACTUATOR

BACKGROUND OF THE INVENTION

1. Field of the Invention

The present invention relates to a magnetic head slider used for a magnetic disk drive.

2. Description of the Related Art

In a head slider for a magnetic disk drive in recent years, a reduction of floating amount for increasing the recording density has been under way. In Fun addition, since a high acceleration is applied in the access direction for enhancing the speed of access, there is a demand for a head slider excellent in stability of floating. Furthermore, a rotation type positioner is widely used for reducing the drive in size and simplifying mechanism, and there is a request for a head slider with less variation of floating amount due to variation of yaw angle.

In order to reduce the floating amount of the head slider, it is necessary to reduce the surface roughness of the magnetic disk surface. In the contact-start-stop (CSS) system widely used until now, the floating surface of the magnetic head slider and the magnetic disk make contact with each other at rotation stop times of the magnetic disk, and the magnetic head slider is floated by the action of the airflow generated attendant on the rotation of the magnetic disk at rotation times of the magnetic disk. Therefore, in the magnetic disk drive of the CSS system, if the surface roughness of the magnetic disk is reduced, the contact area between the floating surface (air bearing surface) of the magnetic disk slider and the magnetic disk surface at the rotation stop times of the magnetic disk is enlarged, so that there may be a risk of stiction occuring between the magnetic head slider and the magnetic disk when the magnetic disk drive starts rotation.

In the magnetic disk drive of the CSS system, in order to obviate the stiction trouble, a technique of texturing the CSS zone of the magnetic disk by laser and a technique of providing the slider floating surface with a plurality of pads (projections) have been proposed. On the other hand, portable personal computers such as notebook-type personal computers are frequently carried and, therefore, are required to have high shock resistance. Therefore, a magnetic disk drive of the loading-unloading system in which the head slider is unloaded from the surface of the magnetic disk at power off times and sleep mode times and is loaded into the position above the surface of the magnetic disk at use times is generally adopted.

In the magnetic disk drive of the loading-unloading system, a cornual portion provided at a tip end portion of a suspension is caused to ride onto a ramp (inclined portion) of a ramp member provided at an outer peripheral portion of a disk medium at power off times or sleep mode times of the computer, whereby the magnetic head slider floating above the magnetic disk with a minute gap is removed from the position above the magnetic disk. By this, it is possible to prevent the magnetic head slider from knocking on the magnetic disk, thereby damaging the magnetic disk, when a shock is exerted on the computer.

The magnetic head slider used for the magnetic disk drive having the loading-unloading mechanism is required to have such high reliability that the contact or collision of the magnetic head slider against the magnetic disk is prevented not only when the magnetic head slider is floating above the magnetic disk but also when the magnetic head slider is loaded into the position above the magnetic disk. In order to reduce the floating gap of the magnetic head slider relative to the magnetic disk, a negative pressure magnetic head slider is often used for the recent magnetic disk drives. For example, Japanese Patent Laid-open No. 2000-173217 discloses a negative pressure head slider with low floating amount, little variation of floating amount and high rigidity.

As a prior art for reducing the floating amount of the magnetic head and lowering the magnetic spacing, Japanese Patent Laid-open No. 2000-348321 discloses a conventional technique of embedding a piezoelectric element in the back surface of the magnetic head slider as shown in FIG. 1. FIG. 2 is an illustration of operation of the prior art example shown in FIG. 1. As shown in FIG. 1, the magnetic head slider has an air inflow end 2a and an air outflow end 2b, and an electromagnetic transducer 4 is provided in the vicinity of the air outflow end 2b.

A laminate-type piezoelectric actuator 6 is embedded on the air outflow end side of the back surface 2c of the magnetic head slider 2. Numeral 8 denotes electrodes of the piezoelectric actuator 6, and a voltage V is applied between the adjacent electrodes 8. As shown in FIG. 2, when the voltage V is applied between the adjacent electrodes 8, the piezoelectric actuator 6 is displaced in the direction of arrow 10. Numeral 11 denotes a magnetic spacing direction, and 12 denotes the transducer displacement direction. Numeral 14 denotes an air bearing surface (ABS) on the air outflow end side, and 16 denotes a recording medium.

In the magnetic head slider 2, as shown in FIG. 2, the displacement direction 10 of the piezoelectric actuator 6 is the rotational direction of the recording medium 16, and the floating amount is regulated through deflection of the slider 2 by displacement of the piezoelectric actuator 6, so that the displacement direction 12 of the electromagnetic transducer 4 is varied according to the displacement amount of the piezoelectric actuator 6. With the piezoelectric actuator 6 driven, the electromagnetic transducer 4 is inclined, so that there is the problem that the electromagnetic transducer 4 does not come to the lowermost point of the slider 2 and the floating amount is unintentionally enlarged, and there is also the problem that time variation (jitter) of recording and/or reproduction is enlarged.

In addition, elongation of the piezoelectric actuator 6 leads to deflection of the air outflow end side ABS 14, resulting in the electromagnetic transducer 4 being brought near to the recording medium 16. However, there is the problem that the positive pressure generated by the air outflow end side ABS 14 is enlarged and the floating amount is rather enlarged. In order to solve these problems, Japanese Patent Laid-open No. 2000-348321 proposes a magnetic head slider comprising a slider main body, a piezoelectric element fixed to the slider main body, and a block having an electromagnetic transducer fixed to the piezoelectric element. However, this magnetic head slider is complicated in structure and suffers the problem that it is difficult to manufacture.

SUMMARY OF THE INVENTION

Accordingly, it is an object of the present invention to provide a head slider in which the floating amount can be arbitrarily controlled within a certain range and recording and/or reproduction characteristics can be enhanced.

In accordance with an aspect of the present invention, there is provided a head slider having a disk faced surface, an air inflow end and an air outflow end, wherein the head slider comprises a front rail having a first air bearing surface, provided on the disk faced surface in the vicinity of the air inflow end; a transducer provided in the vicinity of the air outflow end; and a piezoelectric actuator mounted on a head slider back surface on the opposite side of the disk faced surface excluding the vicinity of the air outflow end.

Preferably, the head slider further comprises a rear rail having a second air bearing surface, provided on the disk faced surface in the vicinity of the air outflow end. The transducer is provided at an air outflow end portion of the rear rail. Preferably, the head slider has a notch extending in the head slider width direction, provided on a head slider back surface at a portion where the piezoelectric actuator is mounted.

In order to reduce the weight of the head slider, the piezoelectric actuator may be embedded in the head slider so that the surface of the piezoelectric actuator is flush with the back surface of the head slider. Preferably, the first air bearing surface comprises a left-side air bearing surface and a right-side air bearing surface spaced from each other. The piezoelectric actuator comprises a left-side piezoelectric actuator provided oppositely to the left-side air bearing surface, and a right-side piezoelectric actuator provided oppositely to the right-side air bearing surface.

In accordance with another aspect of the present invention, there is provided a head slider having a disk faced surface, an air inflow end, and an air outflow end, wherein the head slider comprises a front rail having a first air bearing surface, provided on the disk faced surface in the vicinity of the air inflow end; a transducer provided in the vicinity of the air outflow end; and a piezoelectric actuator mounted over the entire area of the head slider back surface on the opposite side of the disk faced surface; and the piezoelectric actuator has an inactive portion in the vicinity of the air outflow end.

In accordance with a further aspect of the present invention, there is provided a disk drive comprising: a housing having a base; a negative pressure head slider having a transducer for reading/writing data on a disk having a plurality of tracks, an air inflow end, an air outflow end, and a disk faced surface; and an actuator for moving the negative pressure head slider across the tracks of the disk, wherein the actuator comprises an actuator arm rotatably fitted to the base; a suspension whose base end is fixed to a tip end portion of the actuator arm; and the negative pressure head slider mounted on a tip end portion of the suspension; whereas the negative pressure head slider comprises a front rail having an air bearing surface, provided on the disk faced surface in the vicinity of the air inflow end; the transducer provided in the vicinity of the air outflow end; a groove for generating a negative pressure by expanding air once compressed by the front rail; and a piezoelectric actuator mounted on a head slider back surface on the opposite side of the disk faced surface excluding the vicinity of the air outflow end; and the front rail and neighboring portion are deformed in the direction toward a recording medium or away from the recording medium by the piezoelectric actuator to thereby regulate a positive pressure generated on the air bearing surface, whereby the floating amount of the head slider can be regulated.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
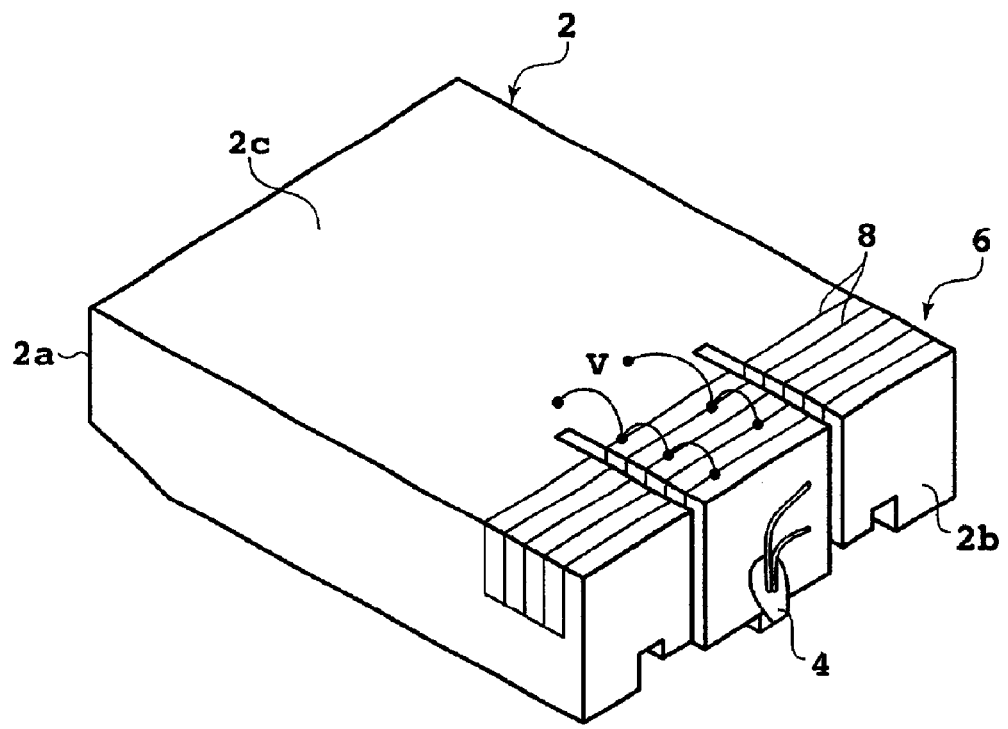
FIG. 1 is a perspective view of a conventional head slider;.
Figure 2:
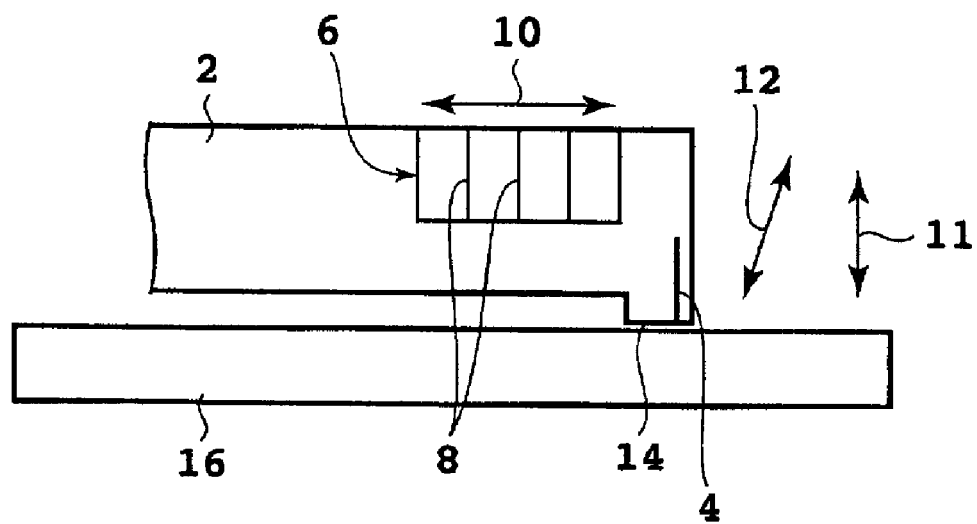
FIG. 2 is an illustration of operation of the conventional head slider.
Figure 3:
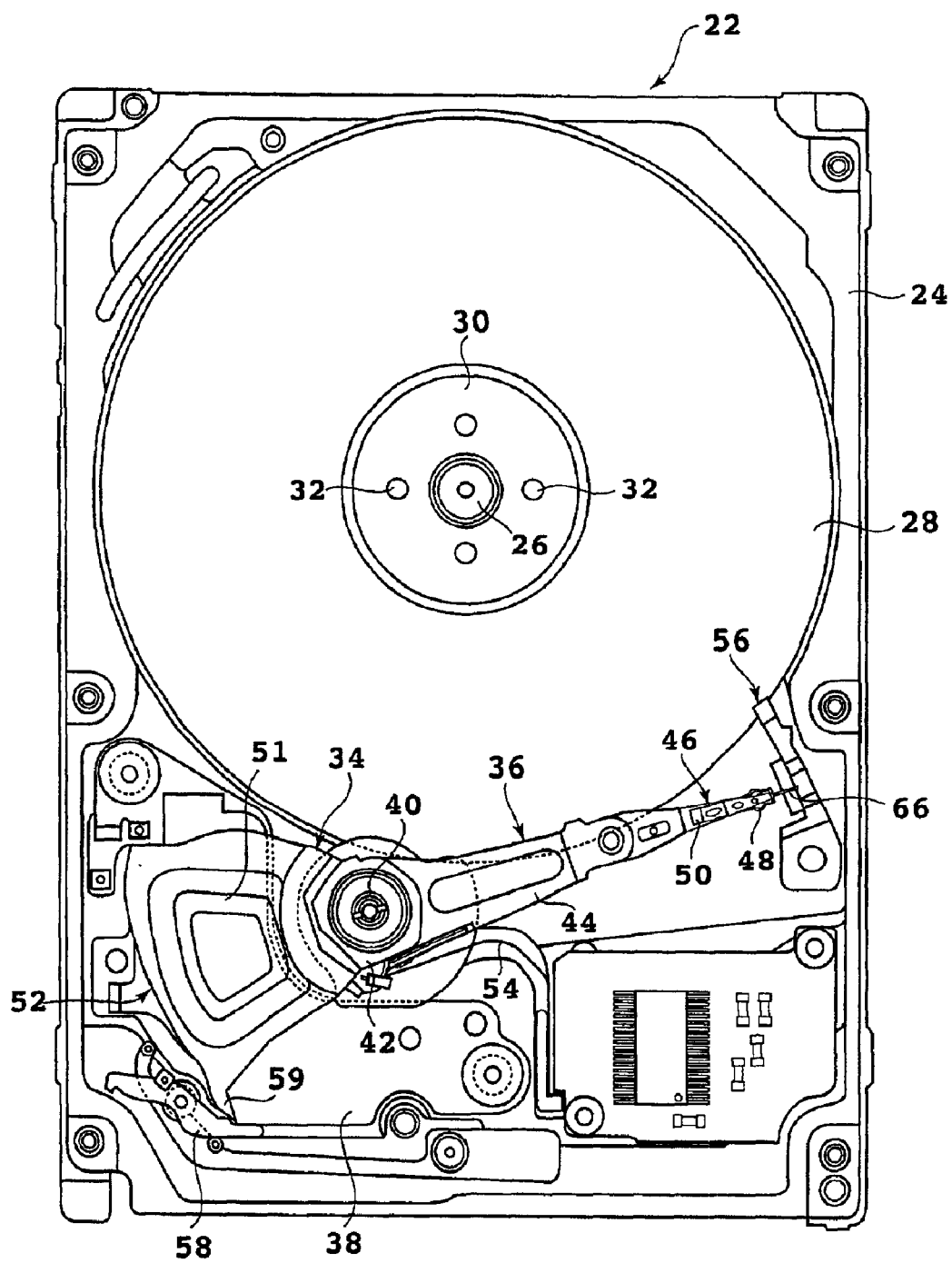
FIG. 3 is a plan view of a magnetic disk drive in the condition where a cover is removed.

Referring to FIG. 3, there is shown a plan view of a magnetic disk drive in the condition where a cover is removed. A housing 22 is composed of a base 24 and a cover (not shown) fixed to the base 24. A shaft 26 is fixed to the base 24, and a spindle hub (not shown) driven to rotate by a DC motor is provided in the surrounding of the shaft 26. Magnetic disks 28 and spacers (not shown) are alternatingly fitted over the spindle hub, and a disk clamp 30 is fastened to the spindle hub by a plurality of screws 32, whereby a plurality of the magnetic disks 28 are fitted to the spindle hub at predetermined spacings.

Numeral 34 denotes a rotary actuator composed of an actuator arm assembly 36 and a magnetic circuit 38. The actuator arm assembly 36 is rotatably mounted to a shaft 40 fixed to the base 24. The actuator arm assembly 36 comprises an actuator block 42 rotatably mounted to the shaft 40 through a pair of bearings, a plurality of actuator arms 44 extended in one direction from the actuator block 42, and head assemblies 46 each fixed to a tip end portion of each of the actuator arms 44. Each of the head assemblies 46 comprises a head slider 48 having a magnetic head element (transducer) for writing/reading data on the magnetic disk 28, and a suspension (load beam) 50 which supports the head slider 48 at its tip end portion and has a base end portion fixed to the actuator arm 44.

A coil 51 is supported on the opposite side of the actuator arm 44 with respect to the shaft 40, and the coil 51 is inserted into the gap of the magnetic circuit 38, thereby constituting a voice coil motor (VCM) 52. Numeral 54 denotes a flexible printed circuit board (FPC) for supplying a writing signal to the transducer and picking up a reading signal from the transducer, and one end thereof is fixed to a side surface of the actuator block 42.

Figure 4A:
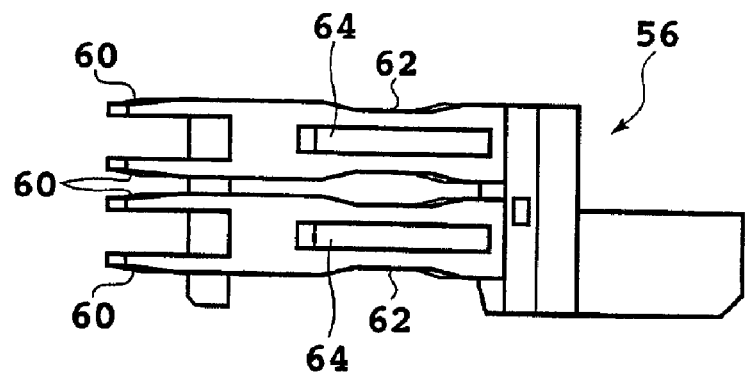
FIG. 4A is a side view of a ramp member.
Figure 4B:
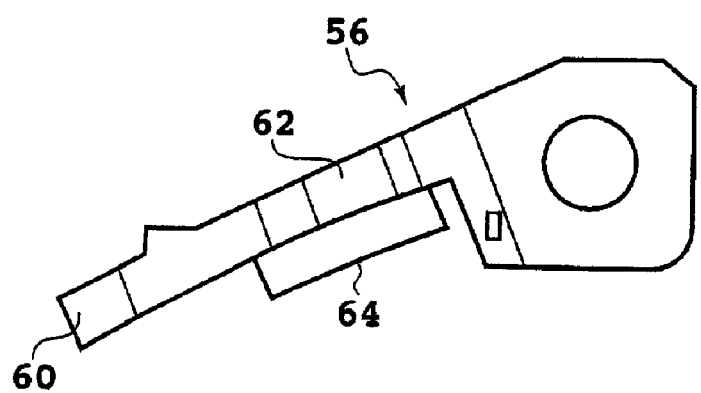
FIG. 4B is a plan view of the ramp member.

A ramp member 56 is fixed to the base 24 adjacently to the outer periphery of the magnetic disk 28. As shown in FIGS. 4A and 4B; the ramp member 56 comprises a plurality of ramps (inclined portions) 60 corresponding to the number of the sliders, and a plurality of parking portions 62 on which cornual portions 66 provided at the tip ends of the head assemblies 46 are stably parked. Projections 64 for preventing the unloaded head sliders from interfering with each other are provided on a side surface of the ramp member 56. Numeral 58 denotes a latch mechanism for latching a projection portion 59 of the actuator 34 in an unloaded condition.

The condition shown is the unloaded condition where the head slider 48 is unloaded from the position above the magnetic disk 28, the cornual portion 66 of the head assembly 46 is parked on the parking portions 62 of the ramp member 56, and the projection portion 59 of the actuator 34 is latched by the latch mechanism 58. When a power source for the computer is turned ON or a sleep mode is released under this condition, the latch mechanism 58 is first released, the actuator 34 is rotated counterclockwise, and the cornual portion 66 slides down the ramp 60, whereby the head slider 48 is loaded into the position above the magnetic disk 28.

When the power source for the computer is turned OFF or the sleep mode is started, a control means such as an MPU mounted on a main printed wiring board of the magnetic disk drive which is not shown controls the actuator 34 so that each of the head sliders 48 is rotated beyond the outer periphery of the magnetic disk 28. By this, the cornual portion 66 of the head assembly 46 climes up the ramp 60 of the ramp member 56, to park in a parking position 62. In this condition, the projection portion 59 of the actuator 34 is latched by the latch mechanism 58.

Figure 5:
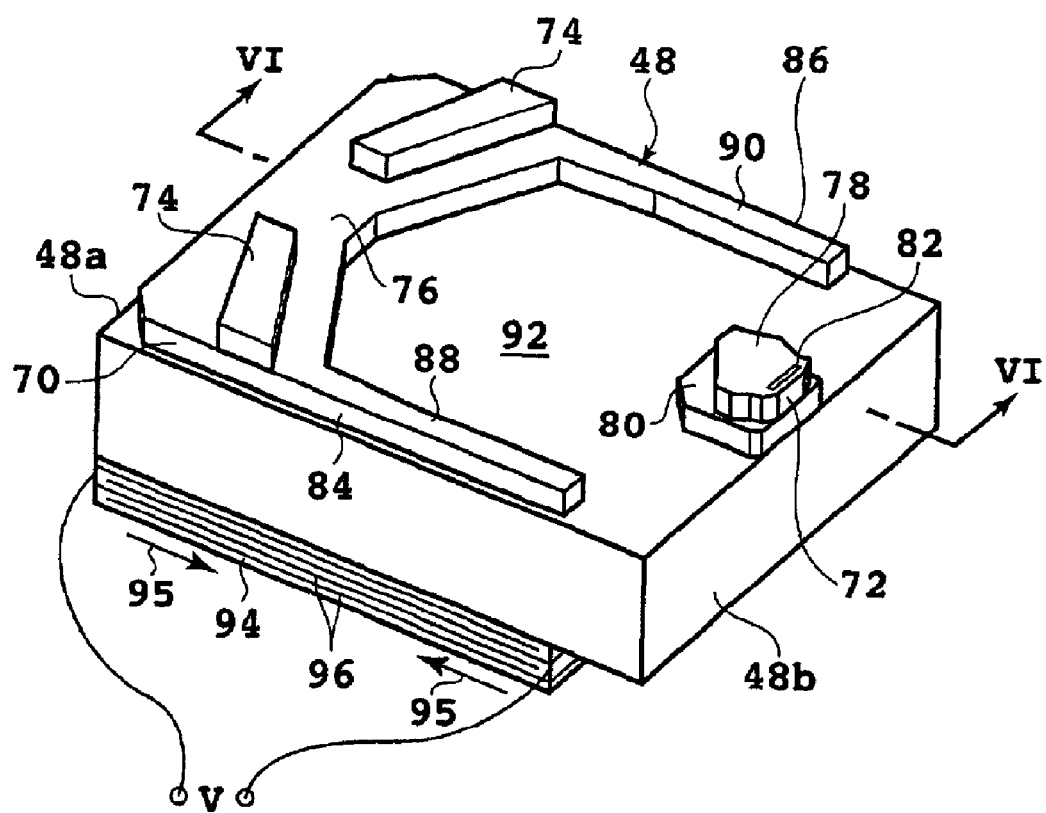
FIG. 5 is a perspective view of a first embodiment of the present invention.
Figure 6:
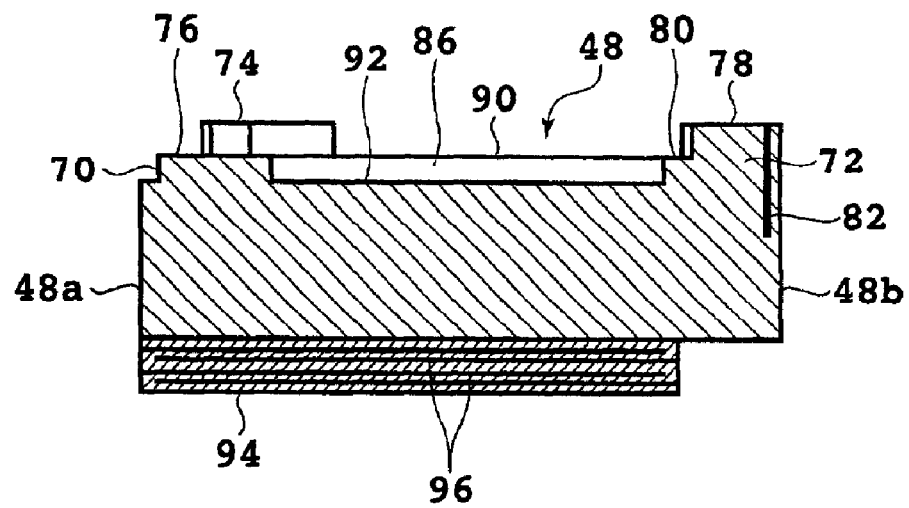
FIG. 6 is a sectional view taken along line VI—VI of FIG. 5.

Referring to FIG. 5, there is shown a perspective view of a negative pressure magnetic head slider 48 according to a first embodiment of the present invention. FIG. 6 is a sectional view taken along line VI—VI of FIG. 5. The magnetic head slider 48 is rectangular parallelepiped in shape, and has an air inflow end 48a and an air outflow end 48b. The magnetic head slider 48 is sized, for example, 1.25 mm by 1 mm and 0.3 mm in thickness. The material of the magnetic head slider 48 is $Al_2O_3$—TiC, and the magnetic head slider 48 is produced by forming a multiplicity of electromagnetic transducing elements (electromagnetic transducers) on a wafer, cutting the wafer into the shape of bars, and processing side surfaces of the bars to provide rail surfaces. The formation of the rail surfaces is carried out by using a photolithography technology.

The magnetic head slider 48 is a negative pressure magnetic head slider, and comprises a front rail 70 provided on the side of the air inflow end 48a, and a rear center rail 72 provided on the side of the air outflow end 48b. The front rail 70 is provided at its top surface with an air bearing surface (ABS) 74, and a step surface 76 lower than the air bearing surface 74 by a predetermined step. Similarly, the rear center rail 72 is provided with an air bearing surface 78, and a step surface 80 lower than the air bearing surface 78 by a predetermined step. An electromagnetic transducing element 82 is provided at an air outflow end portion of the rear center rail 72.

A pair of side rails 84, 86 extending to the downstream side are provided on both sides in the slider width direction of the front rail 70. Top faces 88, 90 of the side rails 84, 86 are at the same height as the step surface 76 of the front rail 70. A groove 92 is provided on the downstream side of the front rail 70. The depth of the groove 92 from the air bearing surface 74 is about 1.4 $\mu$m, and the step between the air bearing surface 74 and the step surface 76 is about 0.2 $\mu$m. Similarly, the step between the air bearing surface 78 and the step surface 80 of the rear center rail 72 is about 0.2 $\mu$m.

A piezoelectric actuator 94 is mounted on the back surface of the head slider excluding the vicinity of the air outflow end 48b. The piezoelectric actuator 94 is composed, for example, of lead zirconate titanate (PZT). A plurality of green sheets of PZT are laminated, a plurality of electrodes 96 are embedded between the green sheets, and the green sheets are integrally adhered by compressing while heating. Then, the integrally laminated green sheets are fired, whereby the piezoelectric actuator 94 is produced.

When a voltage V is applied between the adjacent electrodes 96, the piezoelectric actuator 94 is contracted in the direction of arrow 95 orthogonal to the driving electric field. When a voltage −V is applied between the adjacent electrodes 96, the piezoelectric actuator 94 is extended in the direction opposite to arrow 95. The piezoelectric actuator 94 is a bimorph-type piezoelectric actuator. The piezoelectric actuator 94 can also be produced by use of barium titanate ($BaTiO_3$), lead titanate ($PbTiO_3$) or the like, in place of PZT.

The magnetic head slider 48 is mounted to the suspension 50 at its back surface. When the magnetic disk is rotated and an airflow is generated along the disk surface, the airflow collides against the step between the air bearing surface 74 and the step surface 76 and the step between the air bearing surface 78 and the step surface 80, and then acts on the air bearing surfaces 74, 78. As a result, a buoyancy for floating the magnetic head slider 48 from the disk surface is generated at the air bearing surfaces 74, 78. A buoyancy is also generated at the step surfaces 76, 80, but it is not so large. In this magnetic head slider 48, a large buoyancy is generated at the air bearing surface 74 and, as a result, the magnetic head slider 48 is maintained in an inclined posture with a pitch angle $\alpha$ at the time of floating. Here, the pitch angle $\alpha$ is the inclination angle of the magnetic head slider 48 along the flow line of the airflow.

Figure 7:
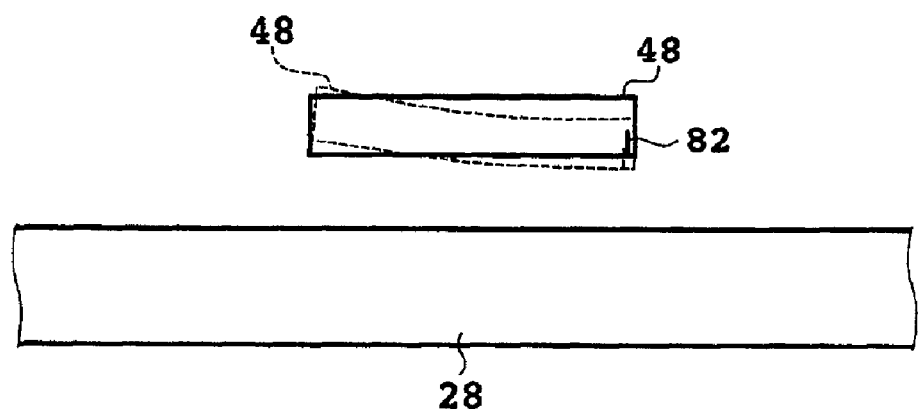
FIG. 7 is an illustration of operation of a magnetic head slider according to the first embodiment.

Since the groove 92 is provided on the downstream side of the front rail 70, the airflow passing along the air bearing surface 74 spreads in the direction perpendicular to the disk surface at the portion of the groove 92 simultaneously when passing through the front rail 70, and, as a result, a negative pressure is generated at the portion of the groove 92. The negative pressure balances with the above-mentioned buoyancy (positive pressure), whereby the floating amount of the magnetic head slider 48 is determined. Furthermore, in the magnetic head slider 48 according to the present embodiment, the piezoelectric actuator 94 is mounted on the back surface of the magnetic head slider 48. When a voltage V is applied between the adjacent electrodes 96 of the piezoelectric actuator 94, therefore, the piezoelectric actuator 94 contracts in the direction of arrow 95 in FIG. 5, resulting in that the magnetic head slider 48 is deformed as indicated by broken line in FIG. 7.

With the magnetic head slider 48 deformed in this manner, the positive pressure generated at the front-side air bearing surface (front ABS) 74 is reduced, and the floating amount of the magnetic head slider 48 is reduced. Therefore, the magnetic spacing between the electromagnetic transducing element 82 and the recording medium 28 is reduced, so that reproduction output of the electromagnetic transducing element 82 can be enhanced. When a voltage of −V is applied between the adjacent electrodes 96 of the piezoelectric actuator 94, the piezoelectric actuator 94 extends in the direction opposite to arrow 95, so that the magnetic head slider 48 is deflected in the direction opposite to the deflection direction indicated by broken line, namely, deflected to the side of the recording medium 28. As a result, the positive pressure generated at the front ABS 74 is increased, and the floating amount of the magnetic head slider 48, is enlarged. Thus, in the magnetic head slider 48 according to the present embodiment, the floating amount of the magnetic head slider 48 is controlled by regulating the positive pressure (a pressure for floating the slider 48 from the recording medium 28) generated mainly at the front ABS 74.

Since the circumferential velocity is greater on the outer periphery side than the inner periphery side of the recording medium (magnetic disk) 28, the floating amount of the magnetic head slider 48 is greater on the outer periphery side. Therefore, when the front ABS 74 is displaced away from the recording medium 28 by the piezoelectric actuator 94 as the outer periphery is approached, the positive pressure generated is reduced to reduce the floating amount, whereby the floating amount can be maintained constant at the inner periphery and the outer periphery. Where the floating amount of the magnetic head slider 48 is constant, recording density can be uniformized. Therefore, zone bit recording becomes easy, and recording density can be enhanced. Also where the reproduction output of the electromagnetic transducing element 82 is low and reading errors are liable to be generated, the floating amount of the magnetic head slider 48 is reduced by driving the piezoelectric actuator 94, whereby the reproduction output is enhanced, and reading errors can be prevented.

Figure 8:
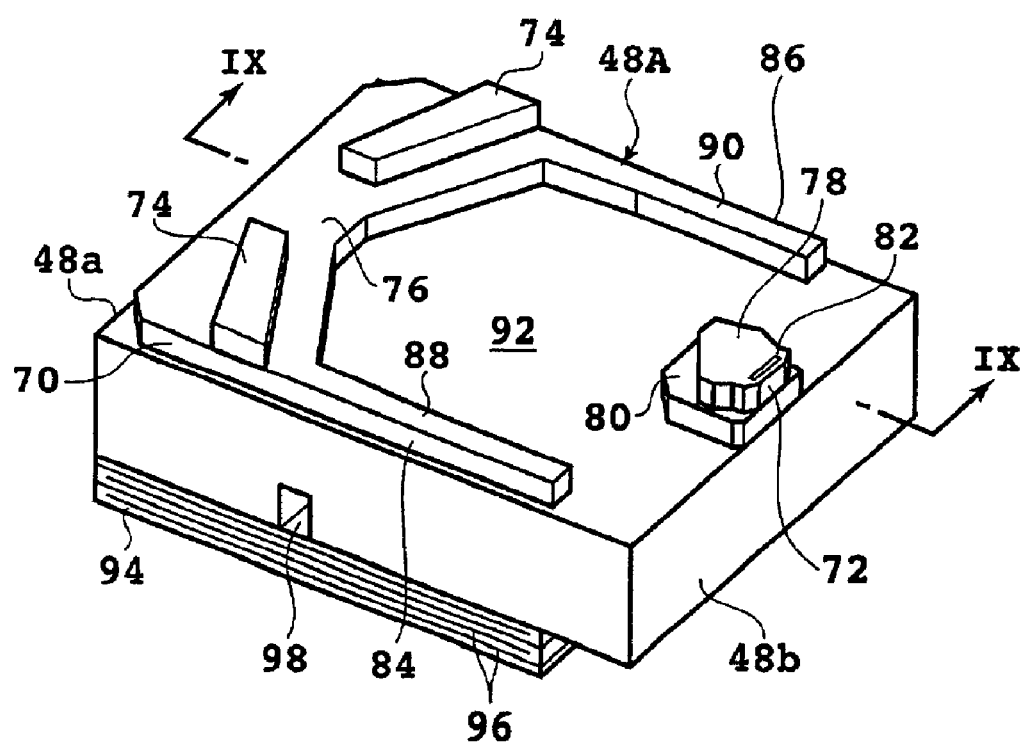
FIG. 8 is a perspective view of a second embodiment of the present invention.
Figure 9:
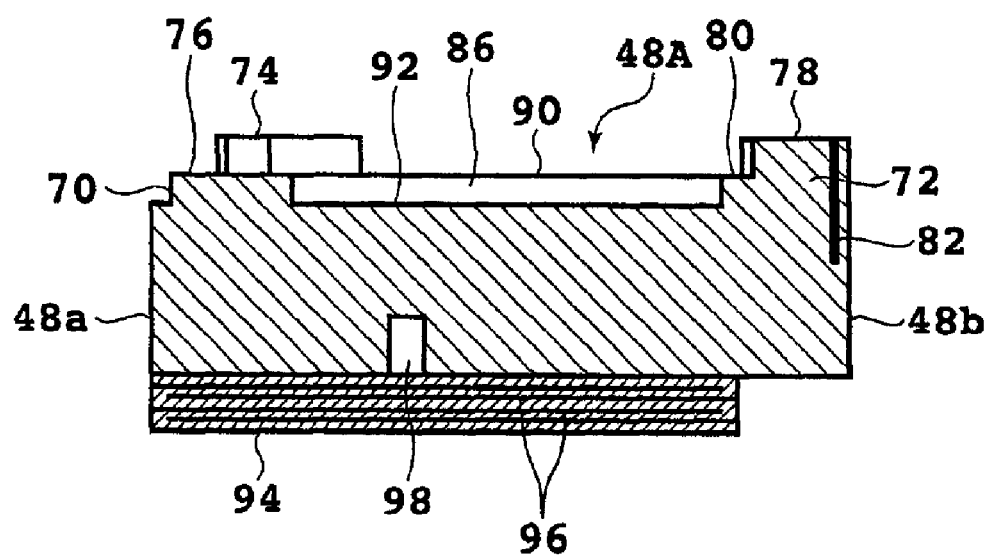
FIG. 9 is a sectional view taken along line IX—IX of FIG. 8.

FIG. 8 is a perspective view of a magnetic head slider 48A according to a second embodiment of the present invention, and FIG. 9 is a sectional view taken along line IX—IX of FIG. 8. In the magnetic head slider 48A according to this embodiment, a head slider back surface at the portion where the piezoelectric actuator 94 is mounted is provided with a notch 98 extending in the slider width direction. Other configulations of the present embodiment are the same as in the first embodiment shown in FIGS. 5 and 6. Thus, by providing the slider back surface with the notch 98, it is possible to restrict the portion where deflection is mainly desired, and to enlarge the deflection amount. Or, it is possible to obtain a desired deflection amount by a lower voltage.

Figure 10:
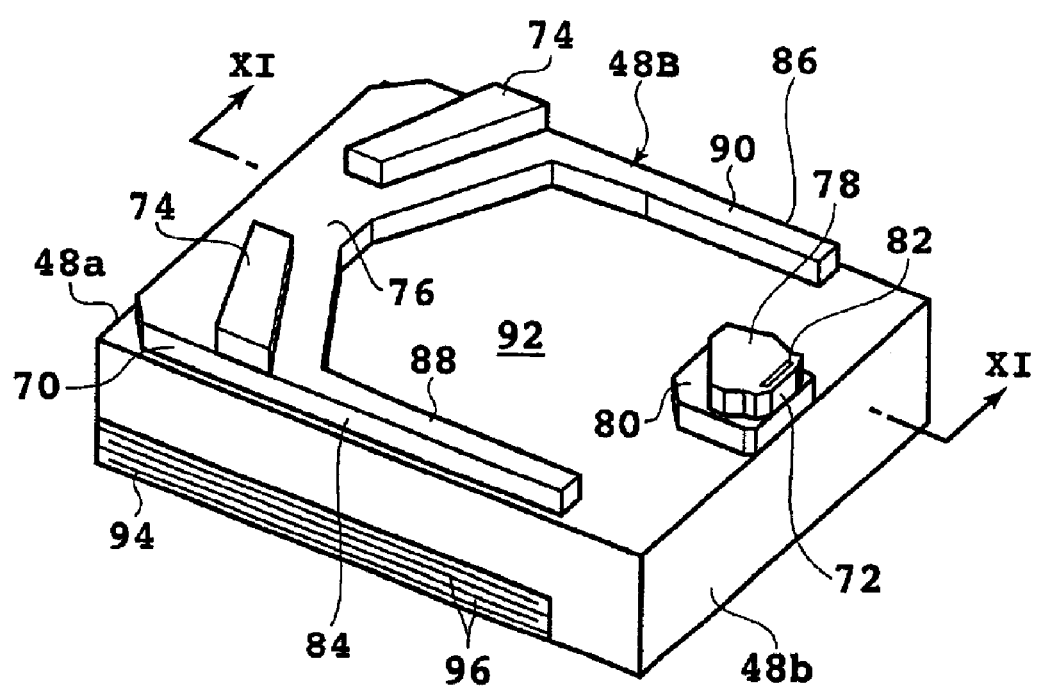
FIG. 10 is a perspective view of a third embodiment of the present invention.
Figure 11:
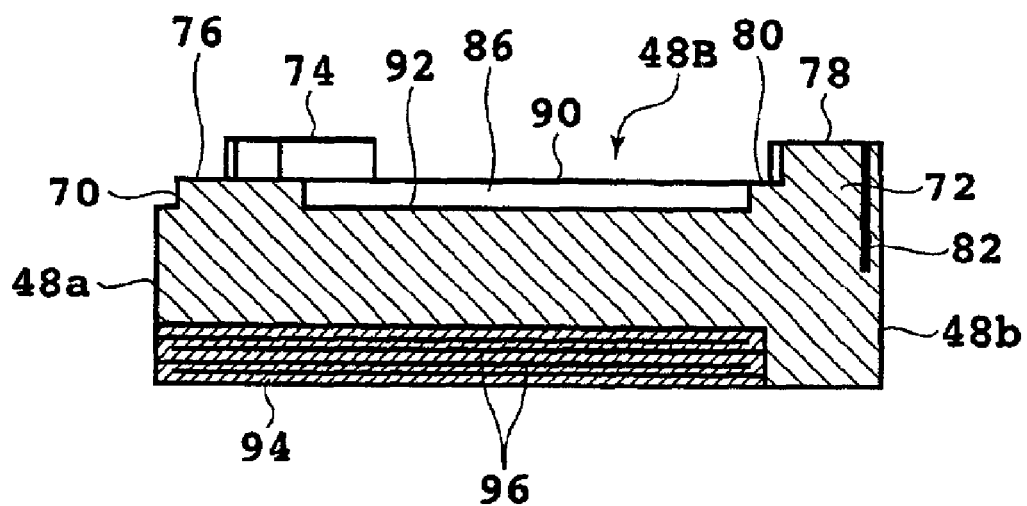
FIG. 11 is a sectional view taken along line XI—XI of FIG. 10.

FIG. 10 is a perspective view of a magnetic head slider 48B according to a third embodiment of the present invention, and FIG. 11 is a sectional view taken along line XI—XI of FIG. 10. In the magnetic head slider 48B according to the present embodiment, the piezoelectric actuator 94 is embedded in the head slider 48B so that the surface of the piezoelectric actuator 94 is flush with the head slider back surface. By this, the increase in mass of the magnetic head slider 48B due to the mounting of the piezoelectric actuator 94 can be suppressed.

Figure 12:
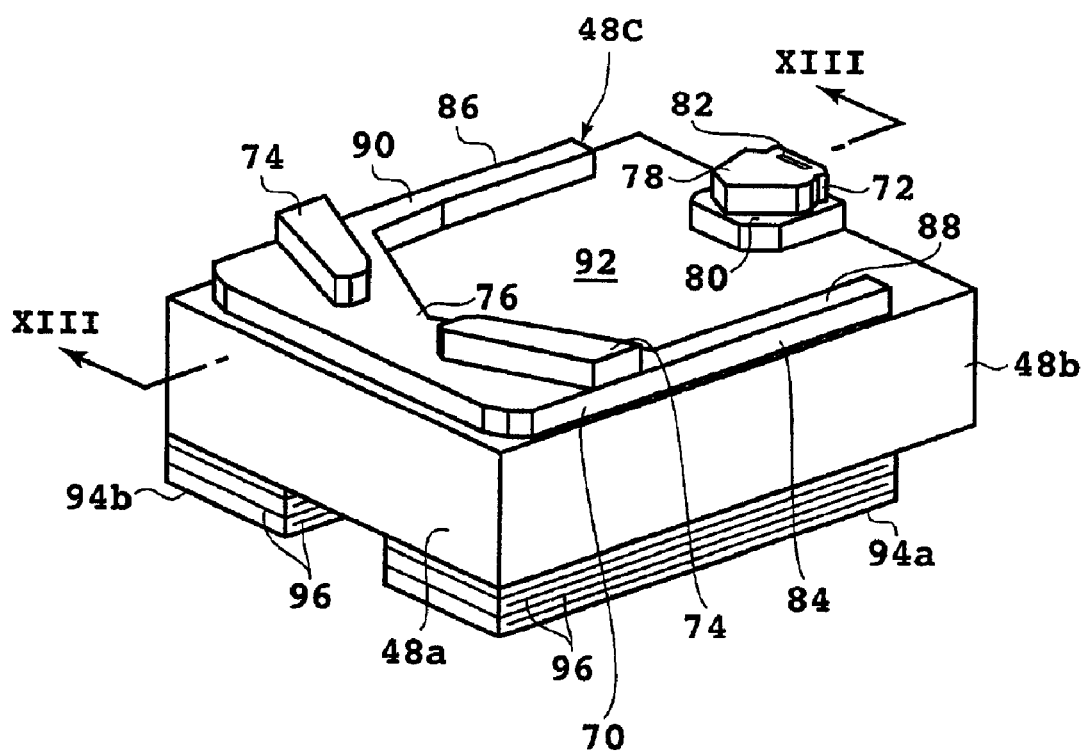
FIG. 12 is a perspective view of a fourth embodiment of the present invention.
Figure 13:
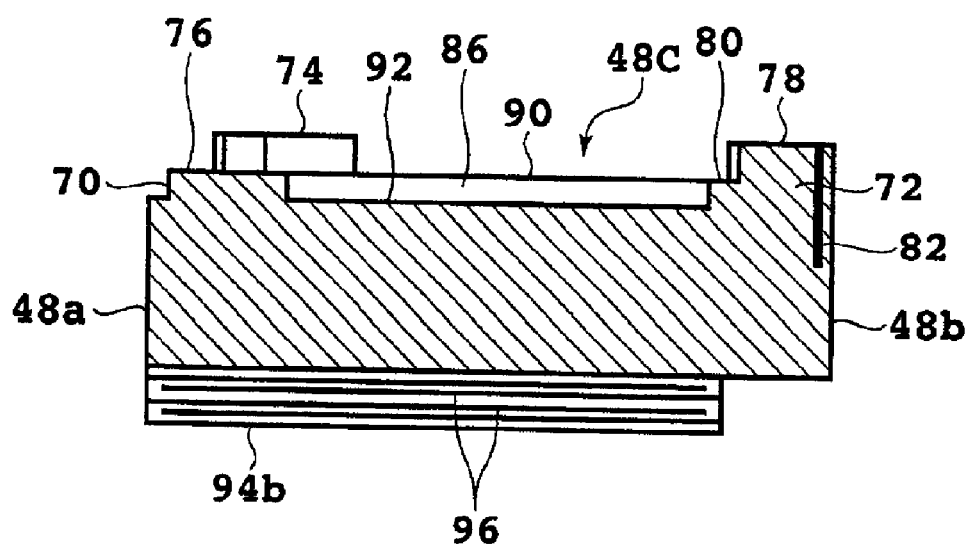
FIG. 13 is a sectional view taken along line XIII—XIII of FIG. 12.

Referring to FIG. 12, there is shown a perspective view of a magnetic head slider 48C according to a fourth embodiment of the present invention. FIG. 13 is a sectional view taken along line XIII—XIII of FIG. 12. In the magnetic head slider 48C according to the present embodiment, two piezoelectric actuators 94a, 94b are mounted on the slider back surface. The left-side piezoelectric actuator 94a is provided opposite to the left-side air bearing surface 74, and the right-side piezoelectric actuator 94b is provided opposite to the right-side air bearing surface 74.

In the same manner as in the first to third embodiments described above, each of the piezoelectric actuators 94a, 94b has a plurality of electrodes 96, and by applying a predetermined voltage between the adjacent electrodes, the piezoelectric actuators 94a, 94b are extended and contracted in the direction orthogonal to the driving electric field. Since the independent piezoelectric actuators 94a, 94b are disposed on the back surfaces of the individual front ABSs 74, there is a difference in deflection amount in the surroundings of the individual front ABSs 74, whereby it is possible to control in the roll direction of the magnetic head slider 48C, and to control the floating posture more finely.

Figure 14:
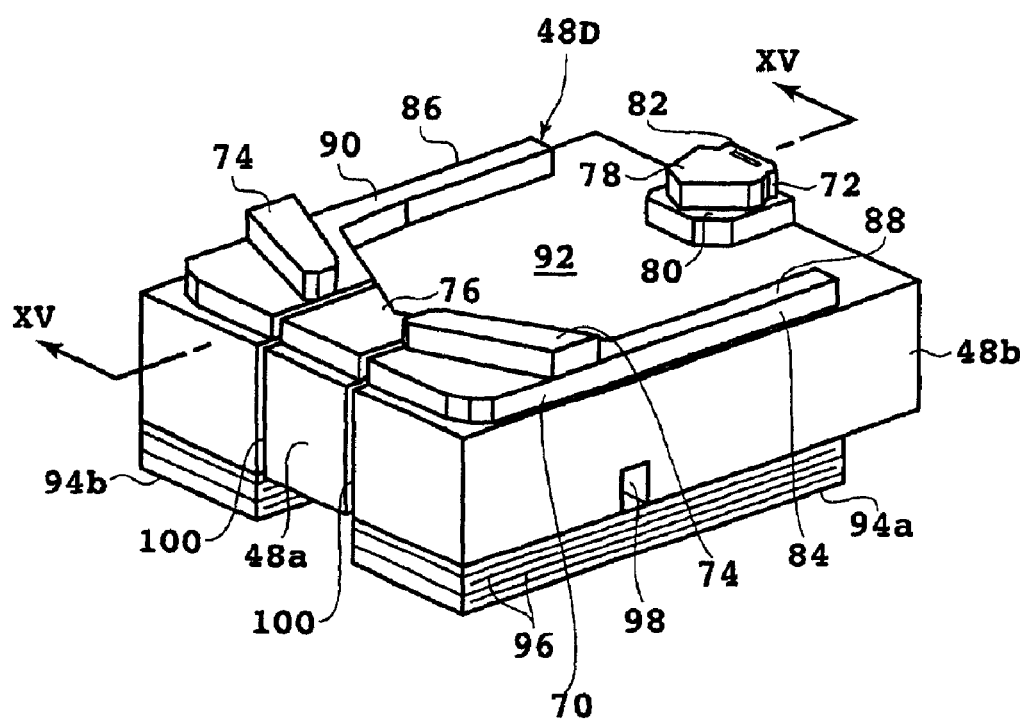
FIG. 14 is a perspective view of a fifth embodiment of the present invention.
Figure 15:
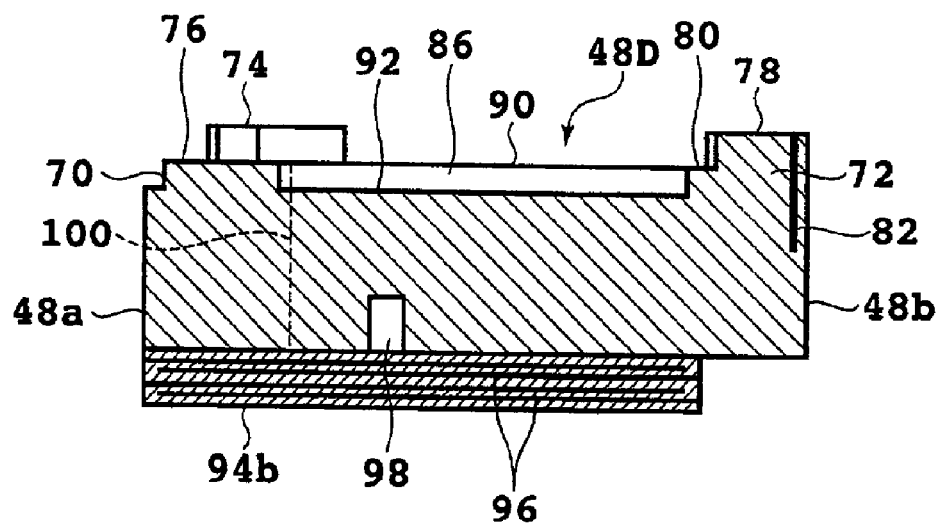
FIG. 15 is a sectional view taken along line XV—XV of FIG. 14.

FIG. 14 is a perspective view of a magnetic head slider 48D according to a fifth embodiment of the present invention, and FIG. 15 is a sectional view taken along line XV—XV of FIG. 14. The magnetic head slider 48D according to the present embodiment includes a notch 98 extending in the slider width direction, provided in the slider back surface, and a pair of slits 100 provided on the inner side with respect to the slider width direction of each of the air bearing surfaces 74. Each of the slits 100 extends at a predetermined distance from the air inflow end 48a and over the area from the disk faced surface to the back surface. Other configulations of the present embodiment are the same as in the fourth embodiment shown in FIGS. 12 and 13. Since the magnetic head slider 48D according to the present embodiment has the notch, 98 and the pair of slits 100, it is possible to restrict the portion where deflection is mainly desired, and to enlarge the deflection amount. Or, it is possible to obtain a desired deflection by a lower driving voltage.

Figure 16:
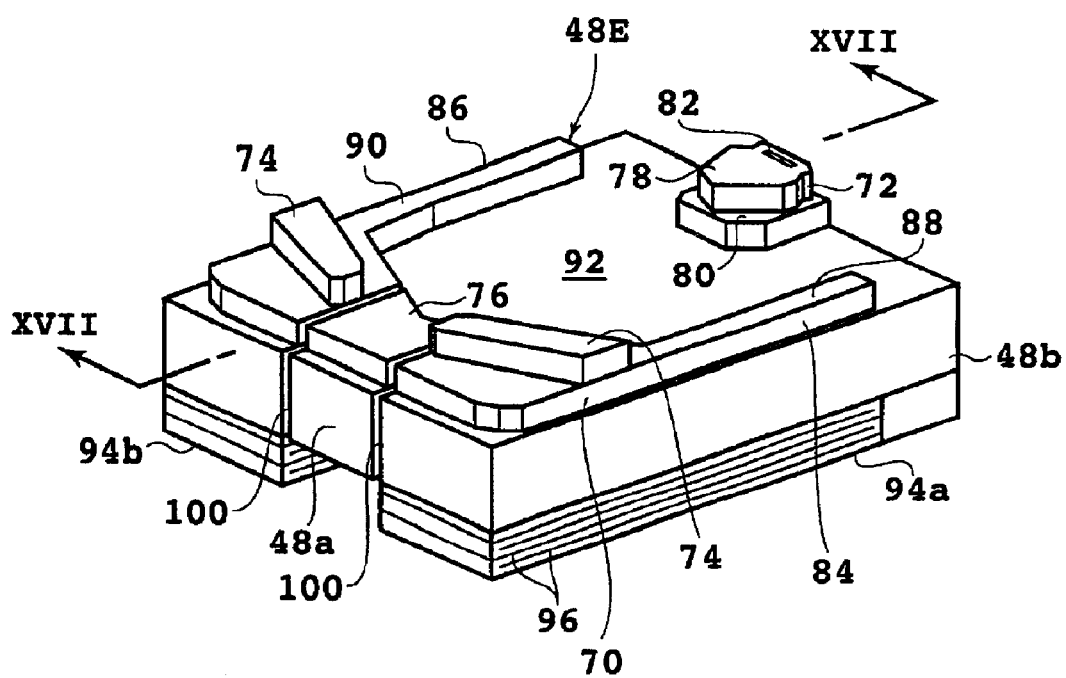
FIG. 16 is a perspective view of a sixth embodiment of the present invention.
Figure 17:
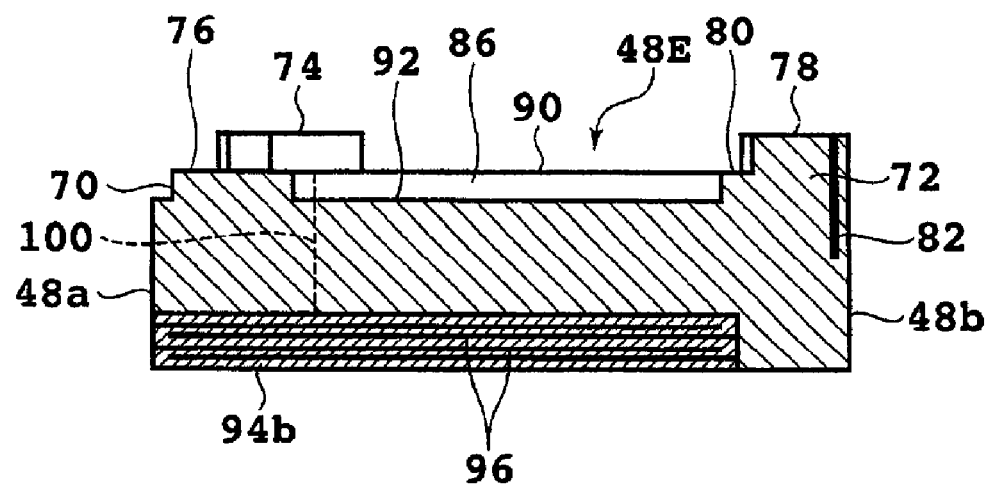
FIG. 17 is a sectional view taken along line XVII—XVII of FIG. 16.

FIG. 16 is a perspective view of a magnetic head slider 48E according to a sixth embodiment of the present invention, and FIG. 17 is a sectional view taken along line XVII—XVII of FIG. 16. In the magnetic head slider 48E according to the present embodiment, in the same manner as in the magnetic head slider 48B according to the third embodiment shown in FIGS. 10 and 11, each of the piezoelectric actuators 94a, 94b is embedded in the head slider so that the surface of each of the piezoelectric actuators 94a, 94b is flush with the head slider back surface. By thus embedding each of the piezoelectric actuators 94a, 94b, the increase in mass of the magnetic head slider 48E due to the mounting of the piezoelectric actuators 94a, 94b can be suppressed.

Figure 18:
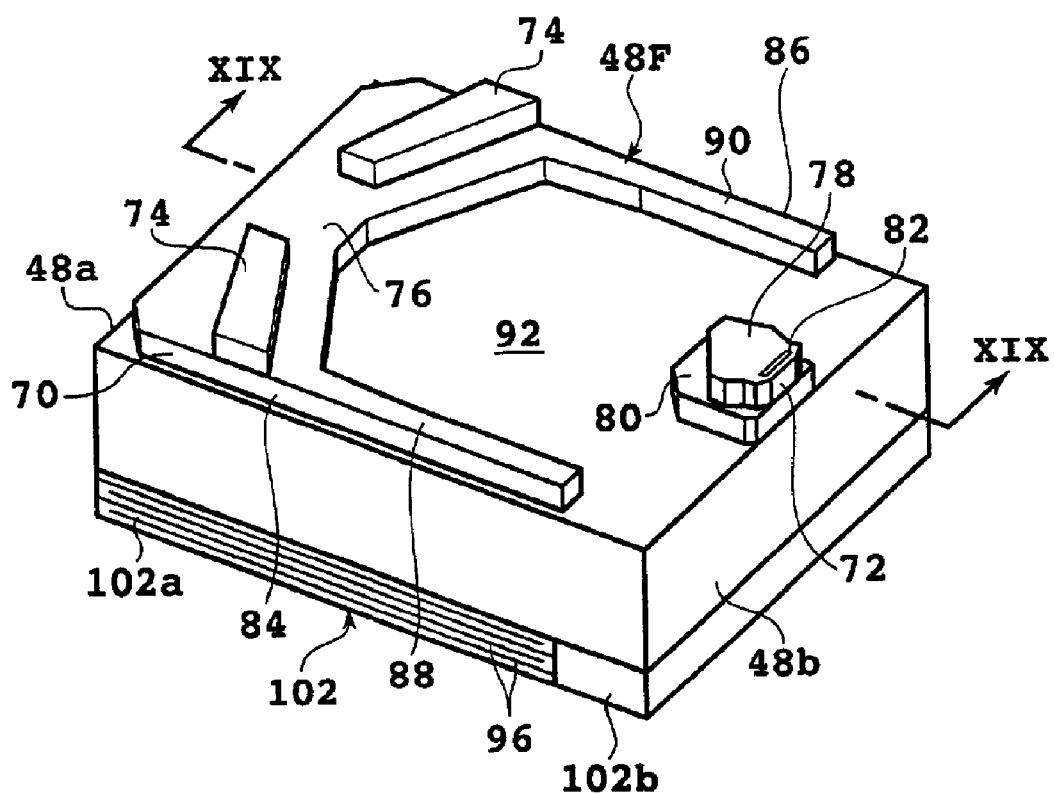
FIG. 18 is a perspective view of a seventh embodiment of the present invention.
Figure 19:
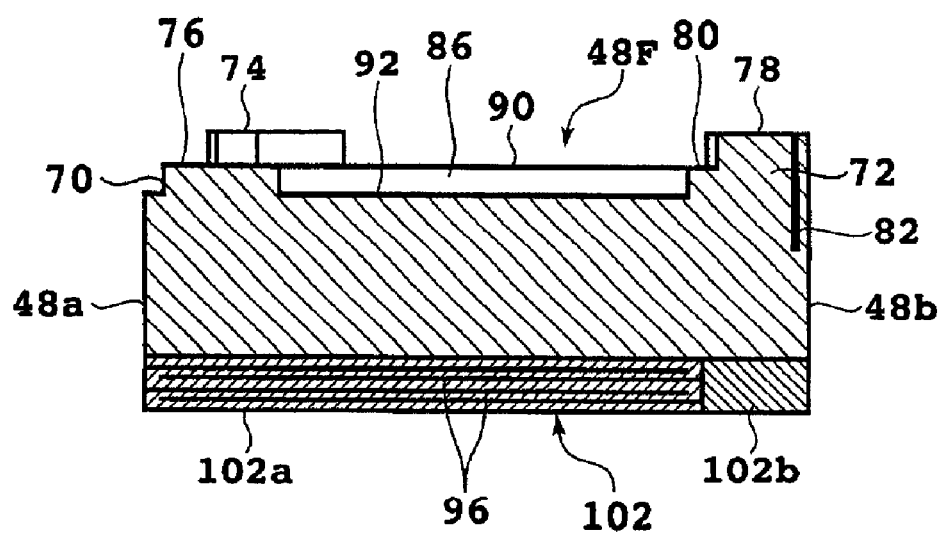
FIG. 19 is a sectional view taken along line XIX—XIX of FIG. 18.

Referring to FIG. 18, there is shown a perspective view of a magnetic head slider 48F according to a seventh embodiment of the present invention. FIG. 19 is a sectional view taken along line XIX—XIX of FIG. 18. In the first to sixth embodiments described above, the piezoelectric actuator 94 is mounted on the back surface of the head slider excluding the vicinity of the air outflow end 48b. In the magnetic head slider 48F according to the present embodiment, the piezoelectric actuator 102 is mounted over the entire area of the back surface of the slider. The piezoelectric actuator 102 includes an active portion (displacement portion) 102a where a plurality of electrodes 96 are embedded and an inactive portion 102b where no electrode is provided. The inactive portion 102b is disposed in the vicinity of the air outflow end 48b.

By thus mounting the piezoelectric actuator 102 on the entire area of the back surface of the slider, connection of the magnetic head slider 48F and the suspension 50 is facilitated. The operation of the present embodiment is the same as that of the magnetic head slider 48 according to the first embodiment described above. While the examples in which a bimorph-type piezoelectric actuator is mounted as a piezoelectric actuator have been described in the above embodiments, a monomorph-type or unimorph-type piezoelectric actuator may be mounted. Furthermore, the actuator is not limited to the piezoelectric actuator, and an electrostrictive actuator, a magnetostrictive actuator, a quartz resonator and the like may also be used.

According to the present invention, as has been detailed above, the surrounding portion of the air bearing surface on the air inflow end side is deformed by the piezoelectric actuator, whereby the balance of a positive pressure and a negative pressure exerted on the head slider can be changed, and the floating amount of the head slider can be controlled. By so controlling as to reduce the floating amount, the electromagnetic transducing efficiency between the electromagnetic transducer and the recording medium can be enhanced. Attendant on this, even where the reproduction output of the electromagnetic transducer is low and reading errors are liable to be generated, the floating amount of the head slider is lowered by driving the piezoelectric actuator, whereby the reproduction output can be enhanced and reading errors can be prevented.

In addition, the circumferential velocity is higher, and the floating amount of the head slider is greater, at the outer periphery than at the inner periphery of the recording medium. Thus, by displacing the front-side air bearing surface in the direction away from the recording medium by the piezoelectric actuator as the outer periphery is approached, the positive pressure generated is reduced, whereby the floating amount of the head slider can be reduced, and therefore the floating amount can be maintained constant at the inner periphery and the outer periphery of the recording medium. Where the floating amount of the head slider is constant, recording density can be uniformized, so that zone bit recording is facilitated and recording density can be enhanced.

The dispersion of the floating amount of the head slider due to the dispersion of the processing of the air bearing surface can be corrected. Furthermore, variation of the floating amount of the head slider according to use place. (difference in height) can be corrected. By independently varying the right-side air bearing surface and the left-side air bearing surface of the front rail, the roll direction of the head slider can also be corrected. Furthermore, at the time of stiction of the head slider onto the magnetic disk, the stiction can be released by varying the air bearing surface by the piezoelectric actuator.

What is claimed is:

1. A head slider having a disk faced surface, an air inflow end, and an air outflow end, said head slider comprising:
   a front rail having a first air bearing surface, provided on the disk faced surface in the vicinity of the air inflow end;
   a transducer provided in the vicinity of the air outflow end;
   a piezoelectric actuator mounted on a head slider back surface on the opposite side of the disk faced surface excluding the vicinity of the air outflow end; and
   a notch extending across said entire head slider in a head slider width direction, provided in the back surface of said head slider at a portion where said piezoelectric actuator is mounted, said notch being not filled by said piezoelectric actuator,
   wherein said head slider can be deformed by said piezoelectric actuator.

2. A head slider as set forth in claim 1, further comprising a rear rail having a second air bearing surface, provided on the disk faced surface in the vicinity of the air outflow end, wherein
   said transducer is provided at an air outflow end portion of said rear rail.

3. A head slider as set forth in claim 1, wherein said piezoelectric actuator is embedded in said head slider so that the surface of said piezoelectric actuator is flush with the back surface of said head slider.

4. A head slider having a disk faced surface, an air inflow end, and an air outflow end, said head slider comprising:
   a front rail having a first air bearing surface, provided on the disk faced surface in the vicinity of the air inflow end, said first air bearing surface including a left-side air bearing surface and a right-side air bearing surface spaced from each other:
   a transducer provided in the vicinity of the air outflow end;
   a pair of piezoelectric actuators mounted on a head slider back surface on the opposite side of the disk faced surface excluding the vicinity of the air outflow end, said pair of piezoelectric actuators including a left-side piezoelectric actuator provided opposite to said left-side air bearing surface, and a right-side piezoelectric actuator provided opposite to said right-side air bearing surface; and
   a notch extending in a head slider width direction, provided in the back surface of said head slider at a portion where said piezoelectric actuator is mounted.

5. A head slider as set forth in claim 4, further comprising:
   a first slit provided over the range from the disk faced surface to the slider back surface in a predetermined length from the air inflow end on the inner side with respect to the width direction of said left-side air bearing surface, and
   a second slit provided over the range from the disk faced surface to the slider back surface in a predetermined length from the air inflow end on the inner side with respect to the width direction of said right-side air bearing surface.

6. A head slider as set forth in claim 4, wherein said left-side and right-side piezoelectric actuators are embedded in said head slider so that the surface of said left-side piezoelectric actuator and the surface of said right-side piezoelectric actuator are flush with the slider back surface.

7. A head slider as set forth in claim 6, further comprising:
   a first slit provided over the range from the disk faced surface to the slider back surface in a predetermined length from the air inflow end on the inner side with respect to the width direction of said left-side air bearing surface, and
   a second slit provided over the range from the disk faced surface to the slider back surface in a predetermined length from the air inflow end on the inner side with respect to the width direction of said right-side air bearing surface.

* * * * *